(12) United States Patent
Simonnet et al.

(10) Patent No.: US 7,257,644 B2
(45) Date of Patent: Aug. 14, 2007

(54) SYSTEMS AND METHODS FOR PROVIDING PRESENCE TRACKING IN A DISTRIBUTED COMPUTING SYSTEM

(75) Inventors: Guillaume Simonnet, Bellevue, WA (US); Harry S. Pyle, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 786 days.

(21) Appl. No.: 10/251,370

(22) Filed: Sep. 19, 2002

(65) Prior Publication Data

US 2004/0059963 A1 Mar. 25, 2004

(51) Int. Cl.
*G06F 15/173* (2006.01)
(52) U.S. Cl. ............ 709/238; 709/204; 340/825; 710/38
(58) Field of Classification Search ........... 709/204, 709/238; 340/825; 710/38
See application file for complete search history.

(56) References Cited

U.S. PATENT DOCUMENTS

| | | | | |
|---|---|---|---|---|
| 5,268,666 | A * | 12/1993 | Michel et al. | 340/310.16 |
| 6,324,161 | B1 * | 11/2001 | Kirch | 370/217 |
| 6,344,794 | B1 * | 2/2002 | Ulrich et al. | 340/539.16 |
| 6,381,218 | B1 * | 4/2002 | McIntyre et al. | 370/245 |
| 6,678,728 | B1 * | 1/2004 | Uppunda et al. | 709/222 |
| 2001/0045914 | A1 * | 11/2001 | Bunker | 343/895 |

OTHER PUBLICATIONS

Ahmad, I., "A Massively Parallel Fault-Tolerant Architecture for Time-Critical Computing," *J. Supercomputing*, 1995, 9(1-2), 135-162.

Betourne, C. et al., "Distributed Control Through Task Migration Via Abstract Networks," *Proceedings—5th International Conference on Distributed Computing Systems*, May 13-17, 1985, 532-538.

Brandauer, C. et al., "Comparison of Tail Drop and Active Queue Management Performance for Bulk-Data and Web-Like Internet Traffic," *Proceedings, Sixth IEEE Symposium on Computers and Communications*, Jul. 3-5, 2001, 122-129.

Bruso, S.A., "A Failure Detection and Notification Protocol for Distributed Computing Systems," *Proceedings—5th International Conference on Distributed Computing Systems*, May 13-17, 1985, 116-123.

Cheng, R. et al., "Reliable Synchronization in Computer Networks," *FTCS 13th Annual International Symposium. Fault-Tolerant Computing. Digest of Papers*, Jun. 28-30, 1983, 178-181.

(Continued)

*Primary Examiner*—Rupal Dharia
*Assistant Examiner*—Grant M. Ford
(74) *Attorney, Agent, or Firm*—Woodcock Washburn LLP

(57) ABSTRACT

Providing presence tracking of nodes of a logical network in a distributed computing system. Each node in a logical network tracks the presence of all other nodes on the network. This presence information is used by the protocol to optimize bandwidth utilization of the shared physical media, by not attempting to communicate with a device that does not appear to be or is unlikely to be present. In one embodiment, the presence tracking is applied to a power line carrier (PLC) physical media because of PLC's low-bandwidth characteristics, low baud rate characteristics and the widespread usage of plugged-in devices, the presence of which on the network is generally more transient by nature.

18 Claims, 7 Drawing Sheets

OTHER PUBLICATIONS

Chung, I.F. et al., "A GA-Based Fuzzy Adaptive Learning Control Network," *Fuzzy Sets and Systems*, 2000, 112(1), 65-84.

Dawson, R.J. et al., "Fault-Tolerant Extensions of Star Networks," *Networks*, 1991, 21(4), 373-385.

Dudek-Dyduch, E. et al., "The Adaptive Tuning of Parameters of Neural network in the Analysis of Fringe Pattern Images in the Computer Vision," *Neural Networks in Engineering Systems. Proceedings of the 1997 International Conference on Engineering Applications of Neural Networks*, Jun. 16-18, 1997, 1, 75-78.

Fahmy, S. et al., "Design and Simulation of Asynchronous Transfer Mode—Available Bit Rate End System Congestion Control," *Simulation-Transaction of the Society for Modeling and Simulation International*, 2002, 78(3), 150-162.

Ghozati, S.A., "Multi-Dimensional Token Ring Networks: Routing and Operation Protocols," *Computers & Electrical Engineering*, 1997, 23(3), 151-164.

Huges Aircraft, "Network Analysis Test Sets to 110 GHz," *Microwave J.*, 1985, 28(1),172.

Itoh, K. et al., "An Integrated Method for Parameter Tuning on Synchronized Queueing Network Bottlenecks by Qualitative and Quantitative Reasoning," *IEICE Trans. Inf. & Syst.*, 1992, E75-D(5), 635-647.

Khasnabish, B. et al., "Performance Evaluation of a Deflection Routing Strategy in Supra-High-Speed Packet Switching Networks," *Proceedings of 36th Midwest Symposium on Circuits and Systems*, Aug. 16-18, 1993, 1, 161-164.

Khasnabish, B., "A New Method for Evaluating Packet Routing Policies in Supra-High-Speed Metropolitan (or Wide) Area Networks," *Computer Networks and ISDN Systems*, 1993, 26(2), 195-216.

Kuroe, Y. et al., "New Computer-Aided Method of Distortion Sensitivity-Analysis and Its Elimination Scheme for Power Electronic Circuits," *IEEE Trans. on Power Electronics*, 1986, PE-1(4), 200-209.

Lee, S. et al., "Intelligent Performance Management of Networks for Advanced Manufacturing Systems," *Proceedings of 2000 IEEE International Conference on Industrial Electronics, Control and Instrumentation*, Oct. 22-28, 2000, 3, 2153-2158.

Lockhart, C.M. et al., "Dynamics of Large Scale Distributed Networks," *1984 Winter Simulation Conference Proceedings*, Nov. 28-30, 1984, 602-603 (Abstract only).

Mon-Yen Luo et al., "Constructing Zero-Loss Web Services," *Proceedings IEEE Infocom 2001. Conference on Computer Communications. Twentieth Annual Joint Conf. of the IEEE Computer and Communications Society*, Apr. 22-26, 2001, 1781-1790.

Mookerjee, P. et al., "Determining the Updating Interval of a Round Robin Sequence for Token Passing Mobile Networks," *35th IEEE Vehicular Technology Conference: Efficiency, Conservation and Productivity*, May 21-23, 1985, 106-111.

Nagarajan, V. et al., "A Simulation Study of Computer Communication Protocols in the Presence of Unsymmetric Traffic," *1983 Proceedings of the International Conference on Systems, Man and Cybernetics*, Dec. 29, 1983-Jan. 7, 1984, 699-704.

Oates, M.J., "Evolutionary Algorithm Performance Profiles on the Adaptive Distributed Database Management Problem," *BT Technology J.*, 2000, 18(4), 66-77.

Reddi, A.V., "Terminal Buffer Memory Analysis in Resource Sharing Local Computer Networks," *Computers & Electrical Engineering*, 1986, 12(1-2), 39-49.

Segall, A. et al., "A Distributed Protocol for Maintaining Central Network Control," *J. Telecommunication Network*, 1984, 3(3), 268-275.

Subhlok, J. et al., "Automatic Node Selection for High Performance Applications on Networks," *SIGPLAN Notices*, May 4-6, 1999, 34(8), 163-172.

Wang, G.J. et al., "Cascade Steepest Descendant Learning Algorithm for Multilayer Feedforward Neural Network," *JSME Int'l J. Series C—Mechanical Systems Machine Elements and Manufacturing*, 2000, 43(2), 350-358.

Wang, X. et al., "IP Multicast Fault Recovery in PIM over OSPF," *Proceedings of ICNP 2000, 8th IEEE Conference on Network Protocols*, Nov. 14-17, 2000, 116-125.

Witzke, E.L. et al., "Tuning Computer Communications Networks and Protocols," *Tenth Annual International Phoenix Conference on Computers and Communications*, Mar. 27-30, 1991, 573-579.

Xu, S.G. et al., "Performance Evaluation of TCP Algorithms in Multi-Hop Wireless Packet Networks," *Wireless Comm. And Mobile Computing*, 2002, 2(1), 85-100.

\* cited by examiner

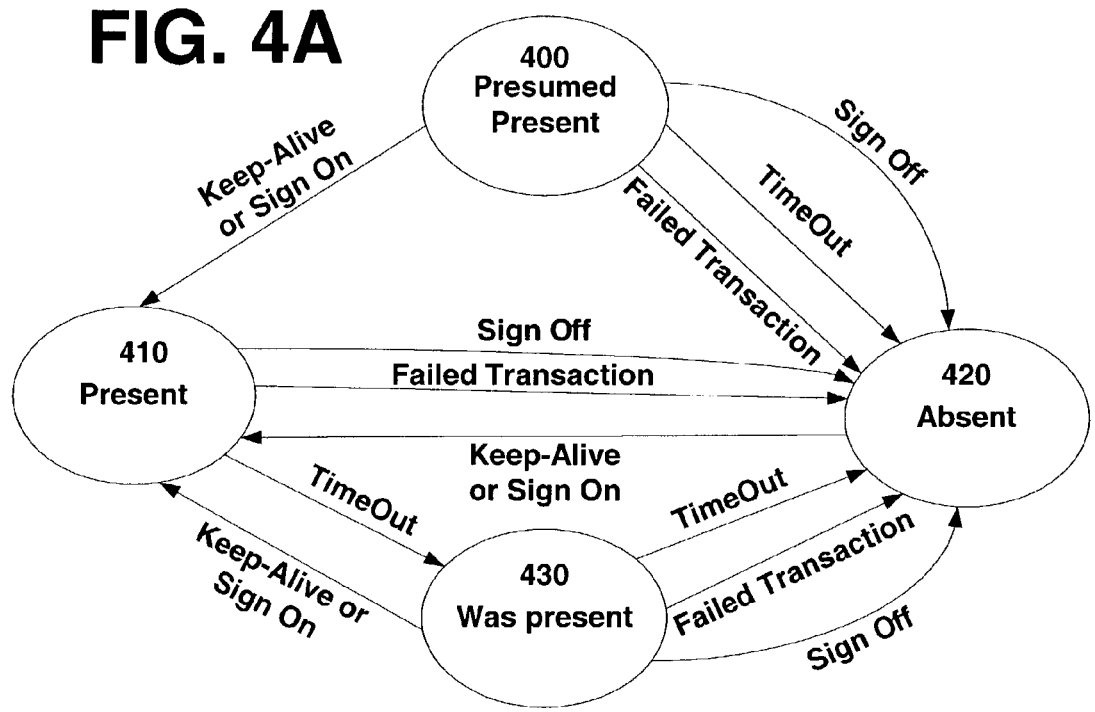
FIG. 4A
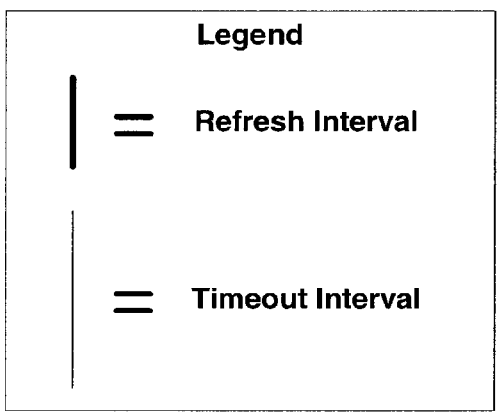
FIG. 4B
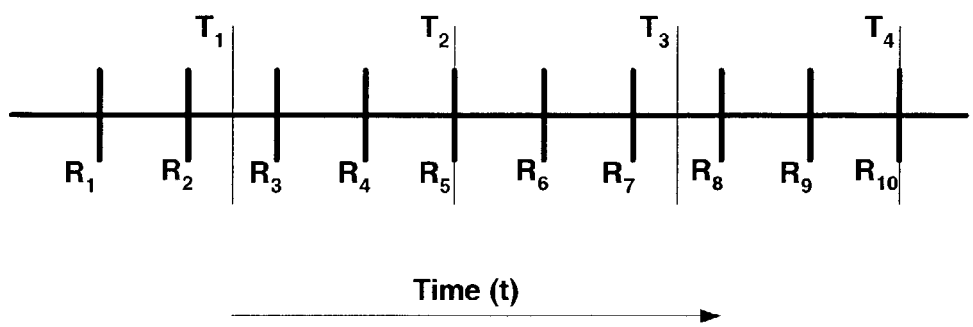
Time (t)

SYSTEMS AND METHODS FOR PROVIDING PRESENCE TRACKING IN A DISTRIBUTED COMPUTING SYSTEM

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 1999–2002, Microsoft Corp.

FIELD OF THE INVENTION

The present invention is directed to systems and methods for providing presence tracking of nodes of a logical network in a distributed computing system. More particularly, the present invention is directed to systems and methods for automatically tuning a logical network with "keep alive" optimization(s).

BACKGROUND OF THE INVENTION

Distributed computing is a field of study that has received increased attention and study in recent years, as network interconnectivity, from wired to wireless, of computing devices and objects continues to mature and computing devices and objects of all kinds continue to proliferate. To this end, a variety of protocols can be used to enable computing devices and objects of all sorts to communicate with one another in a manner that is independent of the particularities of the source and target computing devices.

Examples of such protocols that have been developed include Simple Control Protocol (SCP), x10, and CEBus®. SCP, for instance, is a lightweight device-control protocol that allows manufacturers to create small, intelligent devices that can communicate with each other in a secure and robust manner over low-speed communication networks such as household power lines. With SCP, devices with limited computing power and memory resources—such as light switches, alarm clocks, and appliances—can be part of a peer-to-peer network of other SCP devices. Devices in an SCP network can also participate in more sophisticated Universal Plug and Play (UPnP) networks through a software component called a UPnP to SCP bridge.

The following examples describe some typical scenarios that SCP and other protocols can make possible. Automated lights and light switches can be enabled using SCP such that light switches and fixtures can be controlled from a PC. A homeowner can change "which switches control which lights" without needing to call an electrician to rewire the physical circuits. Interactions among small appliances can also be enabled using SCP. For instance, an alarm clock can automatically start a coffee maker. Interactions among SCP and UPnP devices can also be enabled using SCP. For instance, a homeowner can place a tape in a UPnP-capable VCR and press "Play." The VCR then sends a UPnP event to a rules engine, which places the room into a home theater mode. The rules engine then turns the UPnP TV on and connects it to the VCR audio and video outputs. Then, through an SCP to UPnP bridge, the engine tells the SCP room lights to dim and closes the SCP blinds.

One can thus readily see that SCP, and other protocols like SCP, are powerful vehicles for communication across a variety of computing devices. One can also appreciate that a variety of scenarios are possible with SCP, when one considers the possibility of any computing device or object being able to communicate simply and easily with any other computing device or object.

However, the above-described scenarios presume ideal, or near ideal, network conditions, and in contrast, often the actual physical medium utilized for communications in a logical network is not ideal. For instance, in the case of power line communications, data is not always guaranteed to arrive at its destination, or when it does, there may be some interference along the way that distorts the data or renders it unrecognizable. Similarly, on the reception side of data communications, interference can also be of impact. Moreover, various nodes may become disconnected from the network at widely variant rates, and thus, optimal presence assertion refresh or timeout rates of a first node may be widely different than optimal presence assertion refresh or timeout rates of a second node on the same logical network. For instance, plug-in devices such as a table lamp may have different network behavior characteristics from built-in devices, such as a furnace.

Accordingly, it would be desirable to minimize the number of failed messaging communications by keeping a current list of nodes in the logical network that are present and capable of receiving communications. It would be desirable, for instance, to skip messaging communications for nodes that are absent, and to prioritize messages based upon recency of presence and other assumption(s) or rule(s), which make messages more or less likely to arrive in a robust fashion. In connection with such logical network(s), therefore, it would be desirable to provide presence tracking across logical network(s) for dynamic tuning of the logical network(s) according to messaging conditions, and rates of nodes appearing in or vanishing from the network. It would be further desirable to provide an improved optimization of presence tracking variables across the logical network for lower bandwidth conditions.

SUMMARY OF THE INVENTION

In view of the foregoing, the present invention is directed to systems and methods for providing presence tracking of nodes of a logical network in a distributed computing system. Each node in a logical network tracks the presence of all other nodes on the network. This presence information is used by the protocol to optimize bandwidth utilization of the shared physical media, by not attempting to communicate with a device that does not appear to be or is unlikely to be present. In one embodiment, the presence tracking is applied to a power line carrier (PLC) physical media because of PLC's low-bandwidth characteristics, low baud rate characteristics and the widespread usage of plugged-in devices, the presence of which on the network is generally more transient by nature. Each node on the network asserts its presence by sending a periodic qualifying message and tracks the presence of other nodes by periodically sampling whether a keep-alive has been received.

In another embodiment, the invention tunes presence tracking on a logical network by splitting the logical network's node identification (node ID) address space in two parts, each part being assigned different values for sending and sampling keep-alives. A first group of node IDs are assigned to "fast presence" devices, while a second group of node IDs part are assigned to "slow presence" devices. This process can be managed by an Address Space Arbitrator by using a hint value provided in each device's description information.

Other features and embodiments of the present invention are described below.

BRIEF DESCRIPTION OF THE DRAWINGS

The systems and methods for providing presence tracking of nodes of a logical network in a distributed computing system in accordance with the present invention are further described with reference to the accompanying drawings in which:

FIG. 4A is a block diagram of a node presence tracking state flow diagram;

FIG. 4B is an illustration of potential interplay between refresh and timeout periodicities in accordance with the invention;

DETAILED DESCRIPTION OF THE INVENTION

Overview

Figure 1:
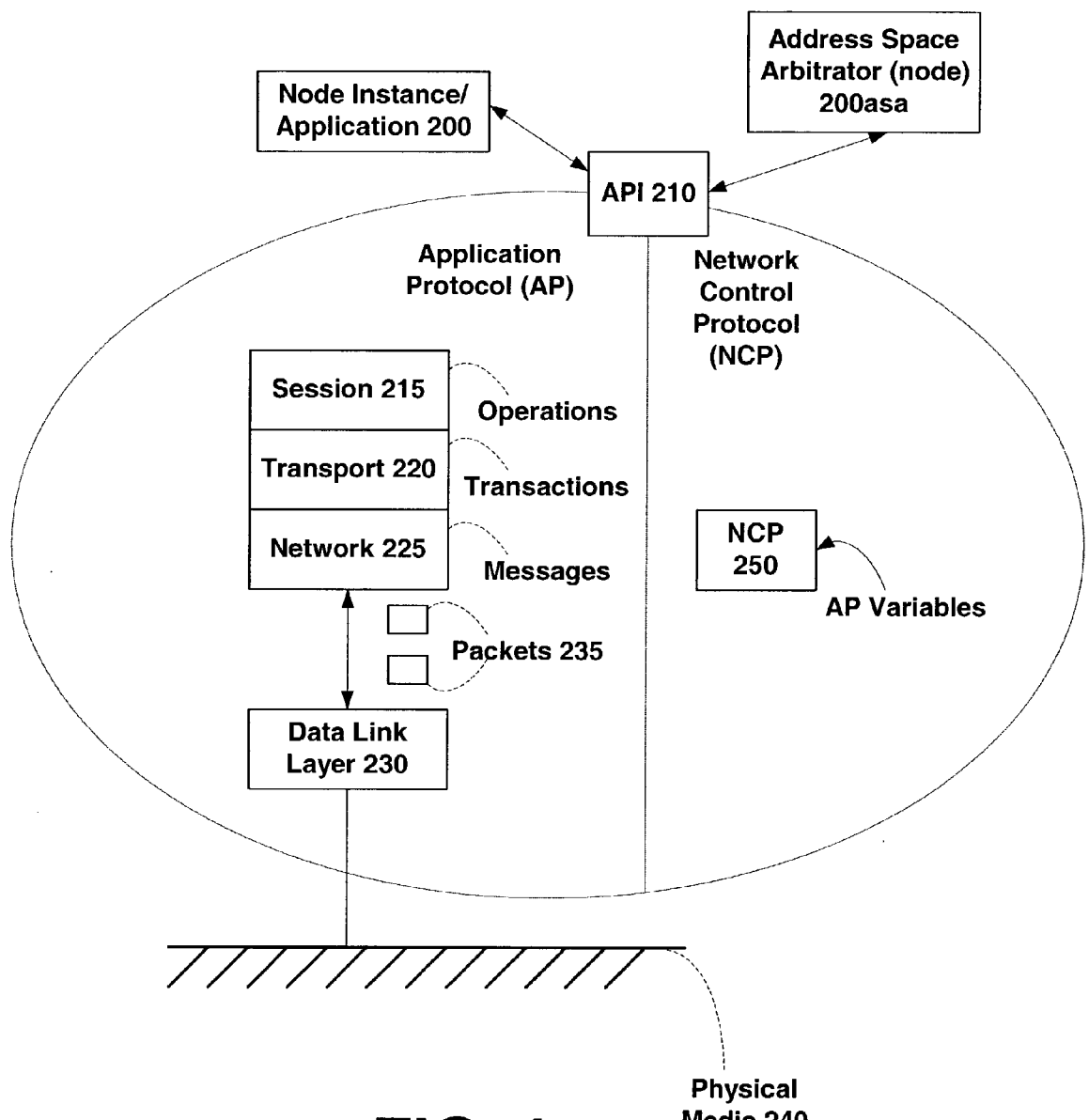
FIG. 1 is a block diagram of one example of a protocol stack in connection with which the invention may be implemented.

As described above, there is a need for improved presence tracking of nodes in a logical network, particularly in connection with a low data rate or baud rate, less than ideal physical network underlying the logical network, wherein low data rates, and transient presence hamper presence tracking. A naive approach would be to frequently refresh the presence of all nodes at the same rate; however, practically speaking, the assertion criteria for different kinds of nodes on the logical network should be flexible. The invention thus provides a simple, yet robust, optimization of "keep alives" in connection with such a low bandwidth, less than ideal physical network that enables dynamic tuning of logical network(s) according to messaging conditions, and rates of nodes coming and going in the network.

In accordance with the invention, each node in a logical network, such as Simple Control Protocol (SCP) network, tracks the presence of all other nodes on the network. This presence information is used by the protocol to optimize bandwidth utilization of the shared physical media, by not attempting to communicate with device(s) which do not appear to be present.

The invention recognizes that presence tracking can be especially critical on the power line carrier (PLC) physical media because of both its low-bandwidth (and therefore baud rate) characteristics and of the widespread usage of plugged-in devices, for which presence on the network is generally more transient by nature. A logical network may include built-in devices (a wall-mounted light control for example) and transient devices (a plugged in table lamp for example) which communicate with one another. Each node on an SCP network asserts its presence by sending a periodic qualifying message or by sending traffic to other nodes; each node tracks the presence of every other node by periodically sampling whether a keep-alive has been received from each node. A keep-alive for a node includes presence assertion by the node itself, or receipt of a qualifying message or packet from the node by another portion of the logical network.

In one embodiment, the invention tunes presence tracking on a logical network by splitting the logical network's node identification (node ID) address space in two parts, each part being assigned different values for sending and sampling keep-alives. The lower node IDs are assigned to "fast presence" devices, while upper node IDs part tracks "slow presence" devices. This process can be actively managed by an Address Space Arbitrator (ASA) by using a hint value provided in each device's description information.

Exemplary Logical Network—Overview of Simple Control Protocol (SCP)

As mentioned, embodiments of the invention apply to logical networks. An overview of SCP is provided herein. Various implementations of SCP support networks that use standard electrical wiring as the physical medium connecting the devices, e.g., the Power Line Carrier (PLC) implementation of SCP. Other SCP implementations for other physical network media such as radio frequency and infrared transmissions can also be utilized.

FIG. 1 illustrates a block diagram overview of an exemplary SCP stack, and exemplary description of various aspects thereof follows. SCP is a protocol that makes use of a physical medium 240, such as PLC. A protocol stack is a way to manage and organize nodes 200 in a distributed system via an API 210, or other object. A node 200 can be either a software object or a hardware object, or a combination of both. One node, the address space arbitrator 200asa, handles discovery, acquisition and maintenance of nodes on the logical network. There is one ASA 200asa per logical network.

Figure 2:
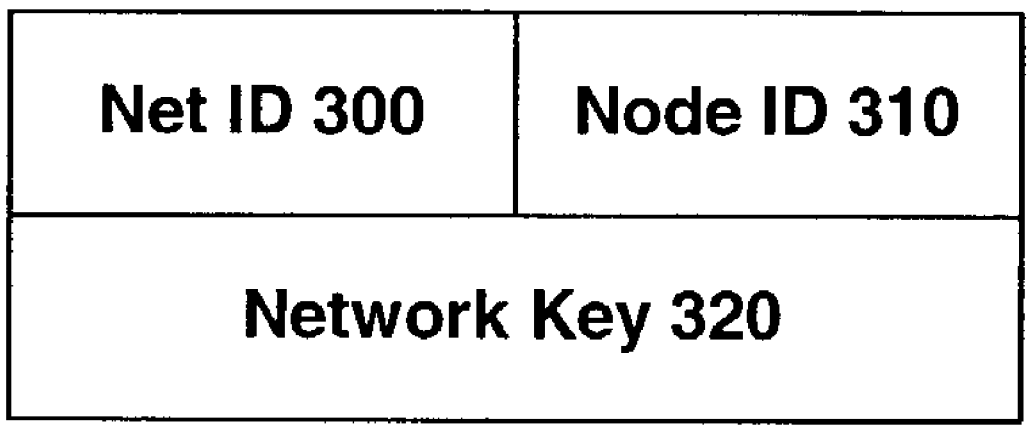
FIG. 2 is a block diagram illustrating exemplary aspects of secure communications of a logical network in accordance with the invention.

A protocol comprises an application protocol (AP) and a network control protocol. The application protocol side implements a session layer 215, a transport layer 220 and a network layer 225 which handle operations, transactions and messages, respectively. A data link layer 230 resides on top of the physical medium 240, and handles the message packets 235 delivered and received by the network layer 225. A protocol encrypts and decrypts communications for security purposes. Message communications make use of a logical address that includes a net ID 300, a node ID 310 and a network key 320, as illustrated in FIG. 2. These enable all nodes associated in a logical network to share a secret, which allows for each to communicate securely with other nodes on the logical network.

An SCP device is a component that uses the SCP to communicate with other devices connected to the same physical medium. SCP accommodates both "hard" and "soft" devices. A hard device is a piece of hardware such as a dimmer switch or a motion sensor. For hard devices, SCP is implemented as a set of integrated circuit (IC) chips that handle all of the protocol-level communication tasks for a device. This chipset, when added to a device, forms a communication subsystem that handles of the protocol-level communication tasks for the device.

A soft device is a software application that runs on a PC under the SCP device emulation environment. This environment emulates the communication subsystem provided by the SCP chipset and allows multiple soft devices running on the same PC to share the same channel of communications to the physical network.

At its simplest, an SCP network consists of two or more SCP devices and the physical medium connecting the devices. A network can also include other software components that run on a PC, such as the SCP to UPnP bridge, the Address-Space Arbitrator, and the Physical Network Manager.

The SCP to UPnP bridge is a special soft device that allows SCP devices to interoperate with UPnP devices. The bridge extends the full capabilities of UPnP to small devices that are not capable of implementing TCP/IP and native UPnP stacks. For example, the bridge allows the properties of an SCP device to be set by using messages sent across a TCP/IP network. All SCP device property relationships are established at the UPnP level through the bridge and propagate down to the SCP device level. The bridge also allows SCP devices to interoperate with devices that use other control protocols. If a bridge exists between those devices and a UPnP network, SCP devices can use UPnP as a common communication language.

The Address-Space Arbitrator (ASA) is another special soft device that forms and manages a logical network of SCP devices. A logical network is a group of devices that are logically separate from other devices connected to the same physical network medium. SCP can support one or more logical networks within the same physical network. For example, a physical network can include a logical network for security devices, another for lighting devices, and yet another for audio-visual equipment. Logical networks are also used in environments such as apartment buildings where adjacent apartments share the same power line. Each apartment uses its own logical network so it does not interfere with the operation of the devices in a neighboring apartment.

The Physical Network Manager is a software component that runs on a PC. It manages the connection to the physical network, allowing multiple soft devices running on the same PC to share the same connection.

An SCP device presents itself on the network as a root device with optional nested sub-devices. Each device (or sub-device) supports one or more services. A service consists of a group of related properties and actions. Properties describe the state of a service, and actions change or access the state of a service. Taken together, the sub-devices, services, properties, and actions of a device are called its device model. The SCP device model is analogous to a programming object, where an object interface provides access to a set of properties and methods that operate on and describe the state of the object.

The SCP device model is based on the UPnP device model, e.g., the device model for an SCP device is a UPnP device description that has been augmented with SCP data. As a device developer, a device model is developed for the device, creating a binary version that the device uses at runtime.

SCP devices work by exposing their properties and actions to other devices, and by using operations to access the properties and actions of other devices on the network. The operation is the fundamental unit of communication among devices. A device uses operations to set and retrieve property values on other devices, to invoke actions on other devices, and to notify other devices when the value of a property changes.

Devices use operations to accomplish many tasks, and one of the primary tasks involves implementing subscriptions. A subscription is a relationship that one device, called the subscriber, sets up between itself and a property on another device, called the publisher. After a subscription is established, the publisher sends notification messages to the subscriber whenever the value of the property changes.

Devices use subscriptions as the basis for setting up property routes. A property route is a one-way connection between two properties: a source property on a publisher device and a destination property on a subscriber device. When the value of the source property changes on publisher device, the subscriber device updates its destination property with the new value.

To illustrate how subscriptions and property routes work, consider a device that exposes a simple timer service consisting of three properties: Increment, which specifies the timer countdown increment in milliseconds; Value, which specifies the current countdown time; and Trigger, which changes from False to True when Value goes to zero. The service also has three actions: Start, Stop and SetValue. For example, if it is desired that the Timer turn on some lights when the Timer's Value property goes to zero, a third-party (for example, a configuration utility) can tell each light to subscribe to the Timer's Trigger property and create a route between that property and the light's Intensity property. Then, when Trigger property becomes True, each light's Intensity property also changes to True, and the lights come on.

One creates an SCP device by integrating the SCP communication subsystem into the device. For a hard device, this involves incorporating the SCP chipset into the circuitry of the device. For a soft device, it involves implementing code in a Windows application that takes advantage of the SCP emulation environment.

The application subsystem connects to the SCP communication subsystem through a serial peripheral interface (SPI) connection. One of the main tasks (besides creating the device model) is to implement a software interface to the SPI connection that allows the device application, running on the application processor, to communication with the communication subsystem. Code is also implemented that allows the device application to control the communication subsystem, using it to communicate with other devices on the network.

To summarize, creating an SCP device involves accomplishing the following tasks. (1) Creating the device model that defines the services, properties, and actions provided by the device, (2) Implementing code in your device application that supports the SPI connection between the application subsystem and the SCP communication subsystem and (3) Implementing code in the application-processor that interacts with the communication subsystem to communicate with other devices in the network.

Commonly assigned copending U.S. patent application Ser. No. 09/556,279 (the '279 application), entitled "System for Networked Component Address and Logical Network Formation and Maintenance" describes a system for forming and maintaining one or more networks of devices connected to a shared media is provided. Aspects of the '279 application include processes for: (a) forming a logical network on the shared media; (b) discovering devices connected to the shared medium; (c) assigning (or acquiring) devices to a logical network; and (d) maintaining a logical network.

Another aspect of the '279 application also defines a message format and protocol for communication over the shared media. The protocol uses a two-level address scheme (e.g., a logical network ID and a device ID) and defines several message types used to support the above processes and other useful features. Each device is expected to have a globally unique device ID, called the Device Serial Number (DSN).

A logical network includes an address space arbiter (ASA) and, typically, one or more devices attached to the shared media. An acquisition authority (AA), interacting with the ASA, is required to complete acquisition of a device by a logical network.

An ASA can form a logical network by selecting a possible logical network ID, when first attached to the physical media. The ASA then broadcasts a message addressed to the entire network to determine whether the possible ID is already taken. If the possible ID is not taken, the ASA adopts the ID as its logical network ID and can begin acquiring devices.

To join a logical network, a device attached to the shared media broadcasts an announce message addressed to the entire shared media. This is initiated at the request of an ASA attached to the shared media. ASAs receiving the announce message then determine whether the device is a "discovered" device. If the device is also not acquired, the AA decides whether to authorize the ASA to acquire the discovered device. If authorized, the ASA then assigns an available device ID to the device. The device ID must be unique within the logical network, but does not necessarily have to be globally unique. The ASA helps maintain the logical network by periodically sending a message to each device of the logical network and waiting for the appropriate response from that device.

One advantage is that the system provides a simple way to segment a shared media into several logical networks. In addition, the system provides an easy-to-use mechanism for connecting devices to a network suitable for the general public.

Exemplary Networked and Distributed Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with the keep alives optimization(s) of the invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may implicate the keep alives optimization (s) of the invention.

Figure 3A:
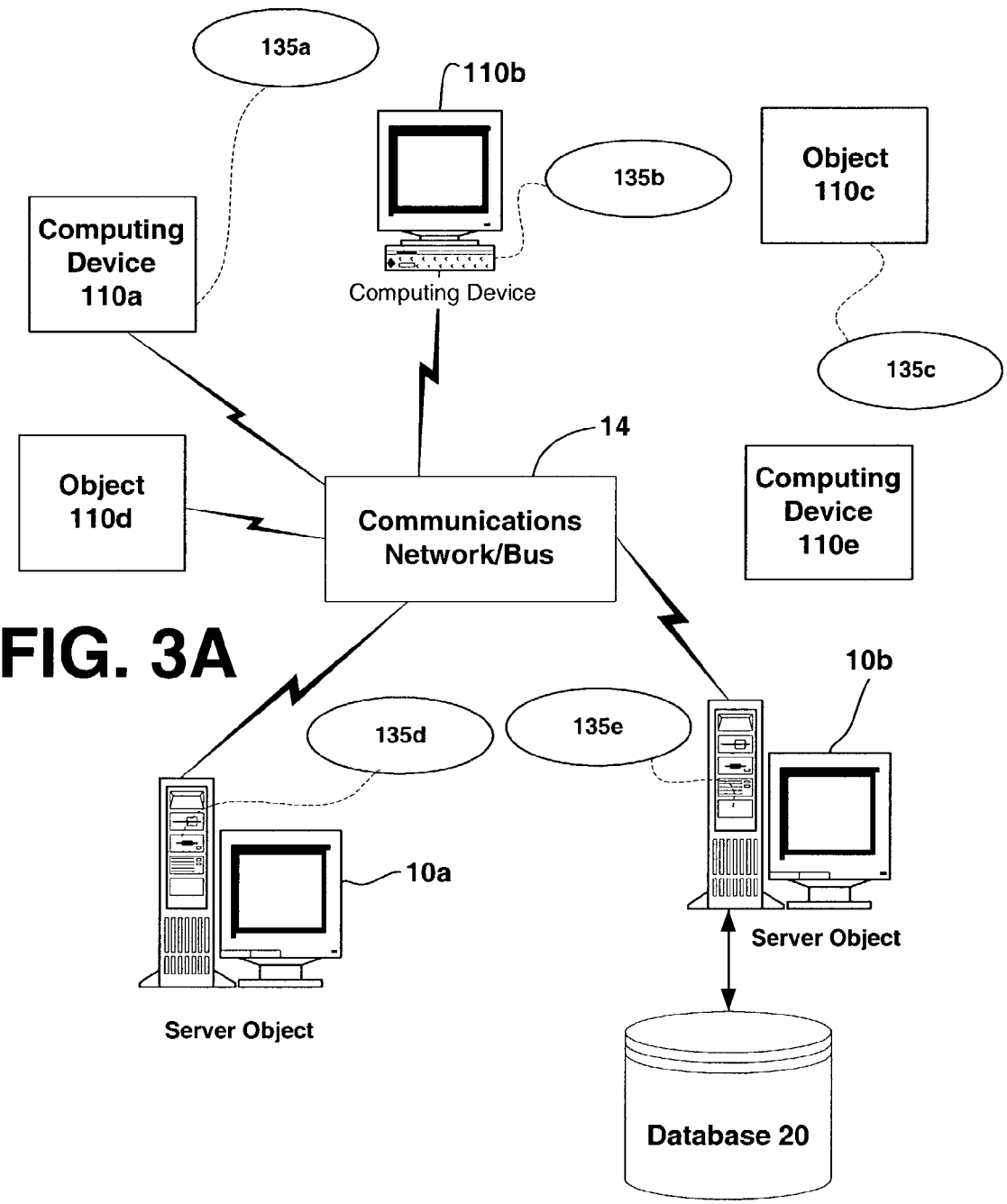
FIG. 3A is a block diagram representing an exemplary network environment having a variety of computing devices in which the present invention may be implemented.

FIG. 3A provides a schematic diagram of an e exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and 1 5 computing devices that provide services to the system of FIG. 3A. In accordance with an aspect of the invention, each object 10a, 10b, etc. or 110a, 110b, 110c, etc. may contain an application that might make use of an API, or other object, software or hardware, to request use of the keep alives optimization(s) of the invention.

In a distributed computing architecture, computers, which may have traditionally been used solely as clients, communicate directly among themselves and can act as both clients and servers, assuming whatever role is most efficient for the network. This reduces the load on servers and allows all of the clients to access resources available on other clients, thereby increasing the capability and efficiency of the entire network. Services that use the keep alives optimization(s) in accordance with the present invention may thus be distributed among clients and servers, acting in a way that is efficient for the entire network.

Distributed computing can help businesses deliver services and capabilities more efficiently across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally or determine anomalous behavior such as a virus and stop it before it affects the network. All sorts of other services may be contemplated as well. Since data may in practice be physically located in one or more locations, the ability to distribute services that make use of the keep alives optimization(s) described herein is of great utility in such a system.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol, such as Power line, data (both wireless and wired), voice (e.g., telephone) and entertainment media.

Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. EEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of sharing data, such as data accessed or utilized incident to program objects, which make use of keep alives optimization(s) in accordance with the present invention.

The Internet commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 3A, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a URL address. For example, communication can be provided over a communications medium. In particular, the client and server may be coupled to one another via TCP/EP connections for high-capacity communication. SCP, x10 and CEBus® are other examples of protocols used for logical network(s).

Thus, FIG. 3A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to implement logical network(s).

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment. Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files may be stored or to which portion(s) of files may be downloaded or migrated. Any computer 10a, 10b, 110a, 110b, etc. may be responsible for the maintenance and updating of a database 20 or other storage element in accordance with the present invention, such as a database or memory 20 for storing application variable(s) or data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 3B:
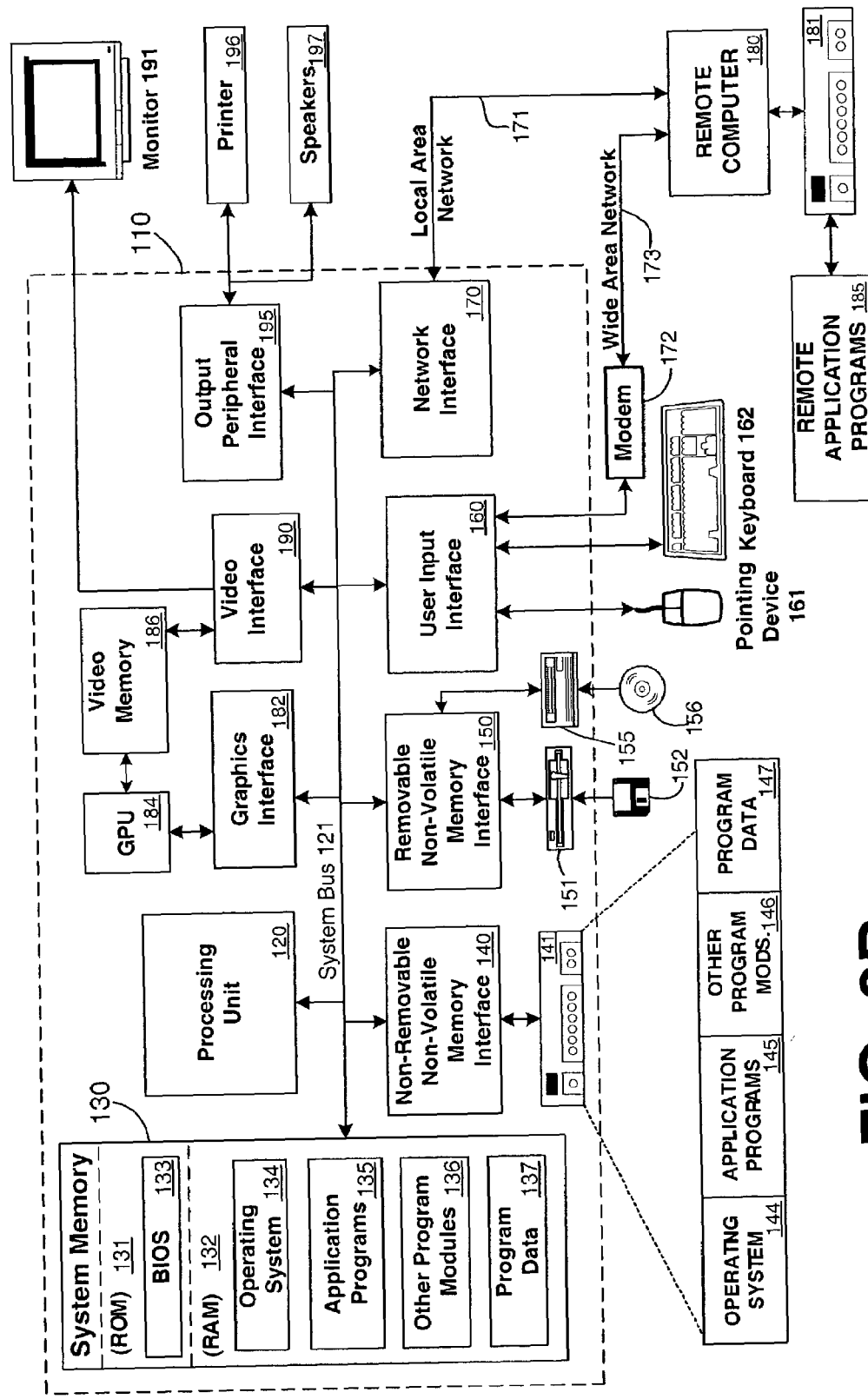
FIG. 3B is a block diagram representing an exemplary non-limiting computing device in which the present invention may be implemented.

FIG. 3B and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/ bus, such as an object placed in an appliance. In essence, anywhere that data may be stored or from which data may be retrieved is a desirable, or suitable, environment for operation of the techniques utilizing keep alives optimization(s) of the invention.

Although not required, the invention can be implemented via an operating system, for use by a developer of services for a device or object, and/or included within application software that operates in connection with keep alives optimization(s) of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 3B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 3B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3B illustrates operating system 134, application programs 135, other program modules 136, and program data 137.

The computer 110 may also include other removable/non-removable, volatile/nonvolatile computer storage media. By way of example only, FIG. 3B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3B provide storage of computer readable instructions, data structures, program modules and other data for the computer 110. In FIG. 3B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186, wherein the keep alives optimization(s) of the invention may have impact. GPUs 184, however, are but one example of a coprocessor and thus a variety of coprocessing devices may be included in computer 110, and may include a variety of procedural shaders, such as pixel and vertex shaders. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 3B. The logical connections depicted in FIG. 3B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3B illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET platform includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well.

Automatic Network Optimization Using Keep Alives Optimization(s)

In accordance with the invention, each node in a logical network tracks the presence of all other nodes on the network. This presence information is used by the protocol to optimize bandwidth utilization of the shared physical media, by not attempting to communicate with a device which does not appear to be present.

With further reference to FIG. 1, the Network layer 225 in each node tracks the presence of all other nodes in its logical network. The Data Link layer 230 supports this capability. The Data Link layer 230 passes all packets up to the Network layer 225, including unicast packets targeting other devices. The Network layer 225 is also supported by special messages from Network Control Protocol (NCP) 250 that are used to indicate when a node 200 comes online, goes offline in a graceful way, and signals its continued presence, e.g., when it has not sent any other packets for a certain amount of time. Node presence tracking may run in either robust or unsecured mode. In unsecured mode (address in the clear), any packet sent qualifies to indicate its presumed originator is present on the logical network, while in robust mode, only authentic and time stamped messages qualify.

In one embodiment, each node keeps track of the presence states of other nodes in the logical network, as per the exemplary non-limiting presence state flow diagram of FIG. 4A. In FIG. 4A, at startup, each node tracked is placed in the "presumed present" state 400. Once qualifying traffic is received from that node anywhere on the logical network, or when the node asserts its presence, i.e., signs on, the node is placed in the "present" state 410. If, however, a failed transaction implicating or targeting the node fails, the node is considered to have entered the "absent" state 420. Similarly, if nothing, e.g., no keep alive message, is heard from the node for a predetermined amount of time, i.e., the node times out, the node is considered to have entered the absent state 420. Moreover, if the node signs off, the node is placed in the absent state 420.

Once in the present state 410, if a failed transaction implicating or targeting the node fails, the node is considered to have entered the absent state 420. Similarly, if the node signs off, the node is considered to have entered the absent state 420. Another way for the node to leave the present state is if a predetermined period of time passes, i.e., if a timeout occurs, without hearing from the node. In such a case, the node leaves the present state 410 for the "was present" state 430. In such circumstances, the node is given special treatment since the node was in fact heard from at some point due to actual traffic from the node, but the timeout condition has been reached. Since timeout may have occurred due to a temporary network aberration as opposed to the node's actual absence, the node is not placed in the absent state 420, but rather is placed into the intermediate was present state 430.

Once in the was present state 430, as a result of a timeout from the present state 410, a node re-enters the present state 410 as a result of the receipt of keep-alive or sign on message from the node. If, however, an additional predetermined period of time occurs without hearing from the node, then a sufficient period of time has passed such that the node can be considered to have entered the absent state 420. Moreover, if a failed transaction implicating or targeting the node fails while the node is in the was present state 430, the node is then considered to have entered the absent state 420. From the absent state 420, the node can only enter the present state 410 upon receipt of a keep alive or sign on message from the node. A node can also enter the absent state 420 by sending a sign off message from any other state. How often a node sends refresh traffic and how long the timeout conditions are can be set as network tuning parameters. Also, as will be appreciated from other embodiments below, some devices merit different settings based upon their characteristic behavior on the network. In one embodiment, the four states, i.e., presumed present 400, present 410, was present 430 and absent 420, are represented with 2 bits. Thus, for instance, in a logical network comprising 2048 nodes, only 512 bytes are required to represent presence information. This is suited for an SCP/PLC implementation on an embedded microcontroller with limited memory resources, such as RAM, as noted above.

As illustrated in FIG. 4B, an exemplary non-limiting choice for a timeout period to refresh period ratio is 2.5, such that there is the possibility of missing a refresh message on the network without removing the node from the present state 410. Additionally, even if two or three refresh messages are missed, the node is not placed in the absent state 420 until 5 or more refresh messages are missed due to the existence of the intermediate was present state 430.

As mentioned above, the presence tracking model of the invention works well with power line carrier (PLC) physical media because of both its low-bandwidth (and therefore low baud rate) characteristics and of the widespread usage of plugged-in devices, for which presence can be a transient quality. Thus, with respect to an exemplary implementation in an SCP network, each node on an SCP network asserts its presence by sending a qualifying message (keep-alive) at least every PresenceRefresh seconds and each node tracks the presence of every other node by sampling every PresenceTimeout seconds whether a keep-alive has been received from each node. As noted above, an exemplary non-limiting heuristic choice is for PresenceTimeout to be set to greater than or equal to 2.0 times PresenceRefresh. This heuristic choice is intended in no way to limit the scope of the invention.

Figure 5:
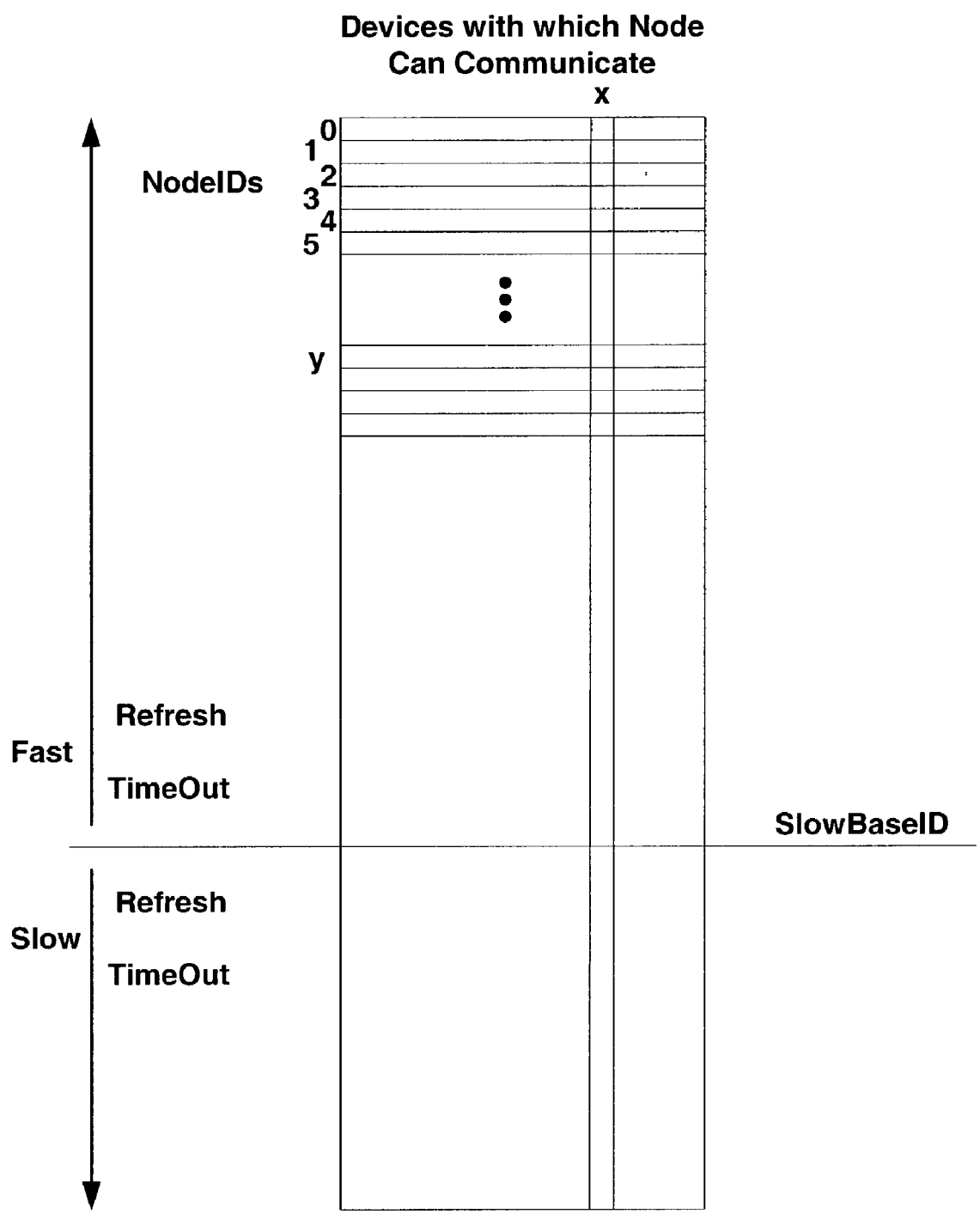
FIG. 5 is a block diagram of a node presence tracking data structure in accordance with the invention.

The invention thus enables a framework for tuning presence tracking on a logical network. In one embodiment, the invention additionally splits the logical network's node identification (node ID) address space in two parts, with each part being assigned different values for PresenceRefresh and PresenceTimeout. In this regard, and as illustrated in the exemplary data structure of FIG. 5, presence information is stored for a given node, which are indexed by nodeID. Devices stored above the SlowBaseID are considered fast devices, and devices stored below the SlowBaseID are considered slow. Alternatively, the lower node IDs can also be assigned to "fast presence" devices, while upper node IDs can track "slow presence" devices. In one embodiment, this process is actively managed by the SCP Address Space Arbitrator, which is described in further detail in commonly assigned copending U.S. patent application Ser. No. 10/417,637, filed Apr. 17, 2003, incorporated herein by reference, by using a hint value called PresenceLease provided in each SCP device's description information.

The invention thus enables the optimization of network bandwidth utilized for presence tracking in what are real-world scenarios for protocols using less than ideal physical media, such as SCP/PLC.

In an embodiment of the invention relating to SCP, SCP's network layer protocol implements a presence tracker, which runs independently on each node. The behavior of the presence tracker is affected by five application variables, described in U.S. patent application Ser. No. 10/251,457 (the 457 application), filed Sep. 19, 2002, entitled "Systems and Methods for Providing Automatic Network Optimization with Application Variables," incorporated herein by reference, identified as follows:

1. eScpAPVars_Net_PresenceSlowBaseId, the node ID where the logical split between fast coming and going devices and slow coming and going devices occurs;
2. eScpAPVars_Net_PresenceFastRefresh, the PresenceRefresh value to be used to track devices with a node ID less than the value specified by eScpAPVars_Net_PresencSlowBaseId
3. eScpAPVars_Net_PresenceFastTimeout, the PresenceTimeout value to be used to track devices with a node ID less than the value specified by eScpAPVars_Net_PresenceSlowBaseId
4. eScpAPVars_Net_PresenceSlowRefresh, the PresenceRefresh value to be used to track devices with a node ID greater or equal than the value specified by eScpAPVars_Net_PresenceSlowBaseId
5. eScpAPVars_Net_PresenceSlowTimeout, the PresenceTimeout value to be used to track devices with a node ID greater or equal than the value specified by eScpAPVars_Net_PresenceSlowBaseId In one embodiment, the presence tracker polls the value of these application variables at certain times, such as every time they are used, since they may be modified asynchronously by the ASA.

In a preferred non-limiting embodiment, the presence tracker performs the following tasks in this order of priority:
1. A keep-alive message is sent if PresenceRefresh seconds have gone by since the last keep alive was sent. The PresenceRefresh is either eScpAPVars_Net_PresenceFastRefresh if the node ID is less than eScpAPVars_Net_PresenceSlowBaseId or eScpAPVars_Net_PresencSlowRefresh if the node ID is greater than or equal to eScpAPVars_Net_PresenceSlowBaseId.

2. Every eScpAPVars_Net_PresenceFastTimeout it scans the presence table up to eScpAPVars_Net_PresenceSlowBaseId and declares any node for which a keep alive has not been received since the last sampling and in the presumed present or was present state as absent and declares any node in the present state as was present.
3. Every eScpAPVars_Net_PresenceSlowTimeout it scans the presence table from eScpAPVars_Net_PresenceSlowBaseId and declares any node for which a keep alive has not been received since the last sampling and in the presumed present or was present state as absent and declares any node in the present state as was present.

Figure 6:
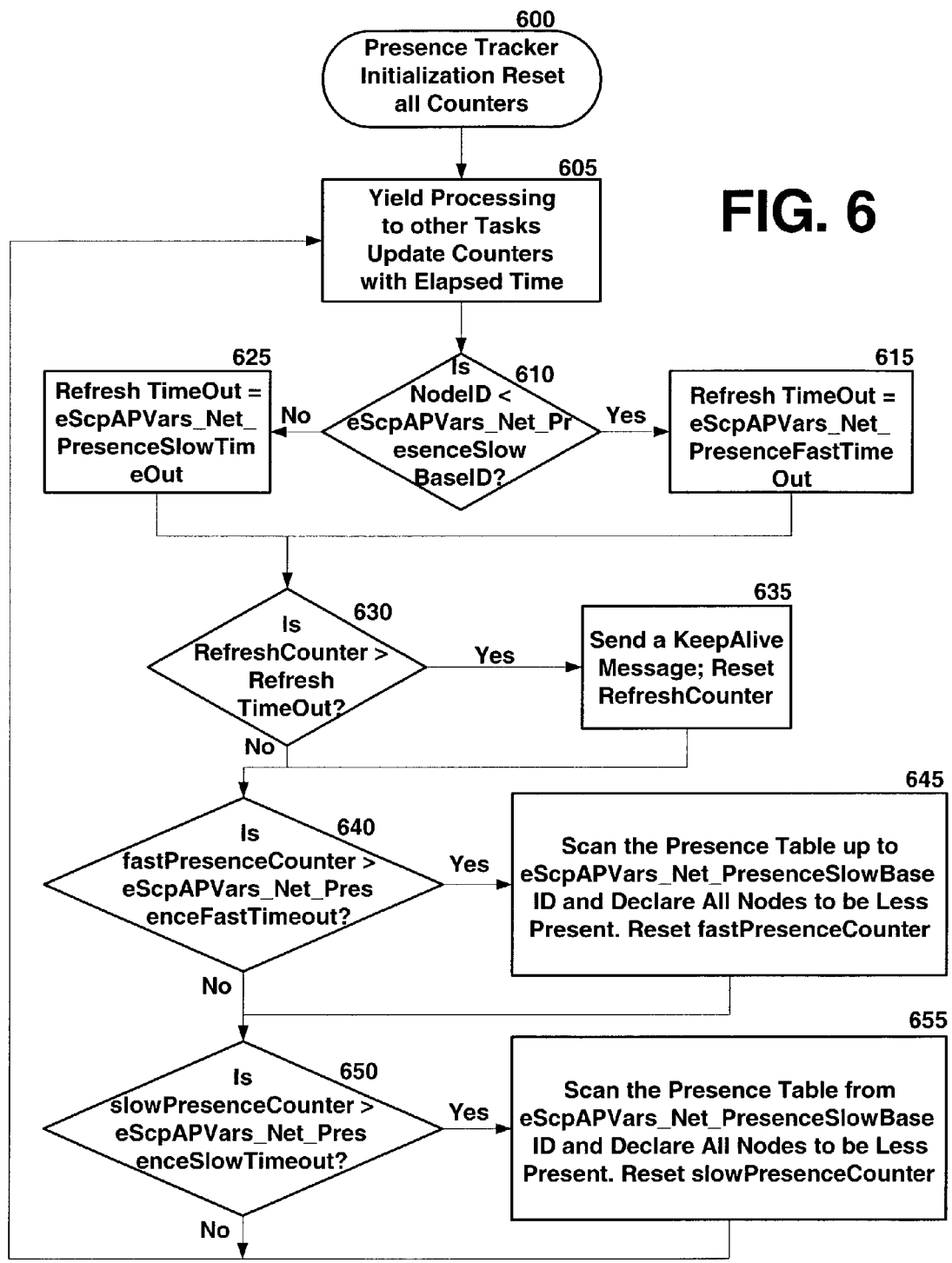
FIG. 6 is a flow diagram of exemplary use of presence tracking application variables and the two tiered assignment of nodes in accordance with exemplary embodiments of the invention.

FIG. 6 illustrates an exemplary non-limiting flow diagram that makes use of the concept(s) described above. At 600, a presence tracker of a node or device resets counters. At 605, counters are updated with an elapsed time (initially zero) and processing to other tasks yields for the update. At 610, a determination is made whether the nodeID of a node is less than the SlowBasedID. If so, at 615, the refresh TimeOut value for the node is set to the fast time out value. If not, at 625, the refresh time out value is set to the slow time out value. At 630, a determination is made whether a refresh counter is greater than the refresh TimeOut value. If so, a keep alive message is sent and the refresh counter is reset at 635, and the flow proceeds to 640. If not, the flow proceeds to 640, where a determination is made whether the fast presence counter is greater than the presence fast timeout variable. If so, at 645, the presence table is scanned up to the SlowBaseID and every node tracked node is declared as less present. In one embodiment, the term "less present" is construed differently for different nodes depending upon their presence states. For nodes that are in the was present or presumed present state, the presence table is scanned up to the SlowBaseID and any node for which a keep alive has not been received since the last sampling is declared as absent. For a node that are in the present state, the presence table is scanned up to the SlowBaseID and the node is declared as "was present." having a less present state than previously, i.e., for a node that is presumed present, the node is declared as absent and for a node that is "was present," the node is declared as absent. For a node that is present, the presence table is scanned up to the SlowBaseID and the node is declared as "was present." The fast presence counter is also reset and the flow proceeds to 650. If not, the flow proceeds to 650, where a determination is made whether the slow presence counter is greater than the presence slow timeout variable. If so, at 645, the presence table is scanned up to the SlowBaseID and every node tracked node is declared as less present. For nodes that are in the was present or presumed present state, the presence table is scanned up to the SlowBaseID and any node for which a keep alive has not been received since the last sampling is declared as absent. For a node that are in the present state, the presence table is scanned up to the SlowBaseID and the node is declared as "was present." The slow presence counter is also reset and the flow proceeds to 605. If not, the flow proceeds to 605.

As mentioned above, presence tracking may run in either robust or unsecured mode. In unsecured mode, any packet sent qualifies to indicate its presumed originator is present on the logical network, while in robust mode, only authentic and time stamped messages qualify.

The address space is separated in two groups of devices: those that tend to time out quickly and those that tend to time out slowly, respectively. In one embodiment, the ASA controls the operating mode and the quick vs. slow devices using application variables.

With respect to presence notifications, various embodiments can be implemented. In one embodiment, the Network layer notifies the higher layers of the following events for a given node: (A) the node just signed on, (B) the node appeared on the logical network, (C) the node vanished from the logical network (timing out), (D) the node presence is placed into the absent state on that node and (E) the node signed off.

These rules help to prevent wasted communication effort and channel bandwidth, as well as stalled message transmission, until SCP detects activity on the part of the node again. The cycle of forcing the absent state, and then re-appearance due to activity, causes a higher layer retry cycle.

An asymmetric (one way) communication fault between two nodes that lasts longer than the maximum time a node is allowed to be silent can cause a corresponding asymmetry in device presence and thus error control protocols used with the node presence mechanism of the invention can optionally take this case into consideration.

It can be appreciated that even at power loss, it is desirable for a node to send an Network Control Protocol sign off message. However, this may not always be possible due to network delays beyond the device's power hold-up time, unacceptable cost of power hold-up components, or abrupt network disconnection (e.g., yanking the plug out of the wall socket), etc.

In robust mode, SCP bases node presence or absence upon the following messages, in the event that the messages are authentic and time stamped with a valid network time: Any application protocol (AP) message that fits in a single packet, whether unicast, multicast or broadcast to the logical network, including (A) an NCP_NetSignOn message, (B) an NCP_NetTimeAssert message, tunneled in an AP packet which is not checked for a valid time stamp, (C) an NCP_NetSignOff message and (D) an NCP_NetPresence message.

In unsecured mode, SCP bases node presence upon either the messages noted above or upon Data Link AP packet source node IDs. In this mode, nodes substitute the NCP_NetPresence message with an empty packet to assert presence, utilizing network bandwidth efficiently.

Since Data Link AP packet addresses are always sent in the clear, a node's presence can be spoofed. However, if this spoofing is done while the real node is active, SCP activates the Data Link imposter detection mechanism. If the spoofing is done while the real node is inactive, no harm is done because the spoofing device cannot cause any action without sending valid (encrypted) Network layer AP messages.

An embodiment for security-critical applications implements an Application layer presence protocol beyond the node presence detection provided by the Network layer. For example, an intruder or fire alarm may require a minimum rate of operations, which causes a fault notification if not maintained. Network load must be carefully considered in such circumstances.

With respect to exemplary, presence protocol, whenever a node becomes active on its logical network, the node sends a NCP_NetSignOn message to try to notify the other nodes of its presence. In one embodiment, the node sends this message as a robust NCP message with normal priority.

If at all possible when reset or powered down, and whenever it is removed from network membership, a node sends the NCP_NetSignOff message to try to notify the other nodes of its absence. In one embodiment, the node sends this message as a robust NCP message with high priority.

The Node identifier (ID) Node ID space is separated in two using the PresenceSlowBaseId application variable. Node IDs starting at this value are tracked as slow presence nodes. The Network layer tracks presence of every other node on the logical network by sampling a presence table at a regular timed interval. If a node has sent a qualifying message during the last sampling interval, it is considered present on the network. This sampling interval is different for quick nodes and slow nodes, as set by the application variables PresenceFastTimeout and PresenceSlowTimeout.

In a further embodiment, it is the responsibility of each node to assert its presence on the network if it has not sent any qualifying messages (what qualifies depends on the presence mode the network is operating in, based on the application variable RobustPresenceFlag) within the time specified by PresenceFastRefresh or PresenceSlowRefresh (whether its node ID is >=PresenceSlowBaseId). In robust mode, the node sends an NCP_NetPresence message, and otherwise an empty AP packet.

As alluded to earlier, refresh time variables are typically set at least two times smaller than the matching time out variable for the network to operate reliably.

Also, the values for these variables may be set statically by the device manufacturer or the installer based on its expected use. They may also be optimized dynamically by the ASA, using an application variables distribution mechanism and the PresenceLease value provided for each device on the network.

The '457 application referenced above describes the use of application variables in a distributed computing system. Application variables allow dynamic tuning and optimization of the protocol of logical network(s) under various operating conditions, which enables reliable operation in connection with low bandwidth physical media. When very high bandwidth physical media is utilized, some inefficiency can potentially be afforded because such inefficiency is hardly noticed from a performance perspective. When a lower bandwidth physical media, such as PLC, is utilized, however, with potential noise considerations as well, dynamic tuning of the network conditions is desirable. For instance, it may be the case that certain message requests from a particular client/server node combination reach the server node quickly and efficiently, however, the return responses to the client over the same physical media periodically are lost, or arrive late. In such a case, it would be desirable to dynamically determine that increased attention to the return responses is desirable. Since such inefficiencies with the return responses may occur intermittently and infrequently, it would be desirable to be able to dynamically make such determinations. The '457 application thus describes some exemplary non-limiting application parameters that may be utilized to tune the network optimally to operating conditions. The present invention applies similar tuning techniques, optimized for node presence tracking.

Application variables are thus network tuning parameters for a protocol, and may be utilized in connection with the node presence tracking of the invention.

The following variables and corresponding non-limiting default values for an exemplary SCP/PLC implementation of node presence tracking for use in tuning network conditions are illustrated in Table I.

TABLE I

Network Presence

| ID | Name | Time (sec. unless stated otherwise) |
|----|------|-------------------------------------|
| 9  | Slow Node Presence Base Id | 1024 Node IDs |
| 10 | Fast Node Presence Refresh | 10 |
| 11 | Fast Node Presence Timeout | 25 |
| 12 | Slow Node Presence Refresh | 60 |
| 13 | Slow Node Presence Timeout | 150 |

In general, application variables can be thought of as relating to any one or more of the following concepts pertaining to network conditions: data link, network, and transport. Presence variables are the relevant network application variables optimized in accordance with the invention.

While some exemplary embodiments herein are described in connection with software residing on a computing device, one or more portions of the invention may also be implemented via an operating system, application programming interface (API) or a "middle man" object, hardware, firmware, such that presence tracking may be included in, supported in or accessed via all of .NET's languages and services, and in other distributed computing frameworks as well. There are thus multiple ways of implementing the present invention, e.g., an appropriate API, tool kit, driver code, operating system, standalone or downloadable software object, etc. which enables applications, nodes, devices and services to use the presence tracking to achieve more complex functionality and more efficient use of lower bandwidth media. The invention contemplates the use of the invention from the standpoint of an API (or other software object), as well as from a software or hardware object that communicates in connection with presence tracking. Thus, various implementations of the invention described herein have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to implement application variables in a logical network. Thus, the techniques for providing automatic network optimization with presence tracking in accordance with the present invention may be applied to a variety of applications and devices. For instance, the algorithm(s) and hardware implementations of the invention may be applied to the operating system of a computing device, provided as a separate object on the device, as part of another object, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the application variables of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for providing presence tracking of nodes of a logical network having an underlying physical network medium in a distributed computing system, comprising:

tracking by each node in the logical network the presence state of at least one other node; and optimizing bandwidth utilization of the physical network medium based upon the presence state of at least one node in the logical network, wherein each part is assigned different values for sending and sampling keep alive messages, wherein the logical network has a node identification (node ID) address space for identifying each node and its associated values for sending and sampling keep alive messages, wherein a first group of node IDs are assigned to fast presence devices, while a second group of node IDs part are assigned to slow presence devices, wherein the node ID address space is split into two parts, and wherein said optimizing includes optimizing at least five application variables including (A) a PresenceSlowBaseId variable that designates the node ID where the logical split between fast presence devices and slow presence devices occurs; (B) a PresenceFastRefresh variable that designates the PresenceRefresh value to be used to track devices with a node ID less than the value specified by the PresenceSlowBaseId variable, (C) a PresenceFastTimeout variable that designates the PresenceTimeout value to be used to track devices with a node ID less than the value specified by the PresenceSlowBaseId variable, (D) a PresenceSlowRefresh variable that designates the PresenceRefresh value to be used to track devices with a node ID that is at least the value specified by the PresenceSlowBaseId variable and (E) a PresenceSlowTimeout variable that designates the PresenceTimeout value to be used to track devices with a node ID that is at least the value specified by the PresenceSlowBaseId variable.

2. A method according to claim 1, further including:
modifying said at least five application variables asynchronously.

3. A method according to claim 2, wherein said tracking includes polling the value of the at least five application variables periodically.

4. A method according to claim 1, wherein said tracking includes sending a keep alive message if PresenceRefresh time has gone by since a last keep alive message was sent, wherein the PresenceRefresh time is one of PresenceFastRefresh and PresenceSlowRefresh.

5. A method according to claim 1, wherein said tracking includes declaring as absent any node in the was present state or presumed present state for which a keep alive message has not been received for PresenceTimeout time, wherein the PresenceTimeout time is one of PresenceFastTimeout and PresenceSlowTimeout and declaring as was present any node in the present state after PresenceTimeout time.

6. A method according to claim 1, wherein said at least five application variables at least one of (A) are set during a node acquisition step, (B) are set by default into one of a device and object and (C) are changed during optimization of the network dynamically.

7. A computer readable storage medium for automatically tuning a network having an associated protocol and a plurality of nodes forming a logical network having an underlying physical network medium having stored thereon at least one computer-executable module comprising computer executable instructions for performing a method, the method comprising:

tracking by each node in the logical network the presence state of at least one other node; and optimizing bandwidth utilization of the physical network medium based upon the presence state of at least one node in the logical network, wherein the logical network has a node identification (node ID) address space for identifying each node and its associated values for sending and sampling keep alive messages, wherein the node ID address space is split into two parts, wherein each part is assigned different values for sending and sampling keen alive messages, wherein a first group of node IDs are assigned to fast presence devices, while a second group of node IDs part are assigned to slow presence devices, and wherein said optimizing includes optimizing at least five application variables including (A) a PresenceSlowBaseId variable that designates the node ID where the logical split between fast presence devices and slow presence devices occurs; (B) a PresenceFastRefresh variable that designates the PresenceRefresh value to be used to track devices with a node ID less than the value specified by the PresenceSlowBaseId variable, (C) a PresenceFastTimeout variable that designates the PresenceTimeout value to be used to track devices with a node ID less than the value specified by the PresenceSlowBaseId variable; (D) a PresenceSlowRefresh variable that designates the PresenceRefresh value to be used to track devices with a node ID that is at least the value specified by the PresenceSlowBaseId variable and (E) a PresenceSlowTimeout variable that designates the PresenceTimeout value to be used to track devices with a node ID that is at least the value specified by the PresenceSlowBaseId variable.

8. A computer readable storage medium according to claim 7, further including: modifying said at least five application variables asynchronously.

9. A computer readable storage medium according to claim 8, wherein said tracking includes polling the value of the at least five application variables periodically.

10. A computer readable storage medium according to claim 7, wherein said tracking includes sending a keep alive message if PresenceRefresh time has gone by since a last keep alive message was sent, wherein the PresenceRefresh time is one of PresenceFastRefresh and PresenceSlowRefresh.

11. A computer readable storage medium according to claim 7, wherein said tracking includes declaring as absent any node in the was present state or presumed present state for which a keep alive message has not been received for PresenceTimeout time, wherein the PresenceTimeout time is one of PresenceFastTimeout and PresenceSlowTimeout and declaring as was present any node in the present state after PresenceTimeout time.

12. A computer readable storage medium according to claim 7, wherein said at least five application variables at least one of (A) are set during a node acquisition step, (B) are burned by default into one of a device and object and (C) are changed during optimization of the network dynamically.

13. A distributed computing system capable of automatically tuning a logical network having an associated protocol and an underlying physical network medium, comprising:

a plurality of nodes, wherein each node in the logical network includes a presence tracking component that tracks the presence state of at least one other node; and a tracking table including the presence state of the at least one other node;

wherein bandwidth utilization of the physical network medium is optimized based upon the presence state of the plurality of nodes in the logical network, wherein the tracking table has a node identification (node ID) for identifying each node and its associated values for sending and sampling keep alive messages, wherein the network is optimized according to network tuning parameters relating to how often a node sends and samples keep alive messages, and wherein at least five application variables are optimized, the at least five variables including (A) a PresenceSlowBaseId variable that designates the node ID where the logical split between fast presence devices and slow presence devices occurs; (B) a PresenceFastRefresh variable that designates the PresenceRefresh value to be used to track devices with a node ID less than the value specified by the PresenceSlowBaseId variable, (C) a PresenceFastTimeout variable that designates the PresenceTimeout value to be used to track devices with a node ID less than the value specified by the PresenceSlowBaseId variable, (D) a PresenceSlowRefresh variable that designates the PresenceRefresh value to be used to track devices with a node ID that is at least the value specified by the PresenceSlowBaseId variable and (E) a PresenceSlowTimeout variable that designates the PresenceTimeout value to be used to track devices with a node ID that is at least the value specified by the PresenceSlowBaseId variable.

14. A distributed computing system according to claim 13, wherein said at least five application variables are modified asynchronously.

15. A distributed computing system according to claim 14, wherein each node polls for the value of the at least five application variables periodically.

16. A distributed computing system according to claim 13, wherein each node sends a keep alive message if PresenceRefresh time has gone by since a last keep alive message was sent, wherein the PresenceRefresh time is one of PresenceFastRefresh and PresenceSlowRefresh.

17. A distributed computing system according to claim 13, wherein each node in the was present state or presumed present state for which a keep alive message has not been received for PresenceTimeout time, wherein the PresenceTimeout time is one of PresenceFastTimeout and PresenceSlowTimeout, is declared absent and each node in the present state is declared as was present after PresenceTimeout time.

18. A distributed computing system according to claim 13, wherein said at least five application variables at least one of (A) are set during a node acquisition step, (B) are burned by default into one of a device and object and (C) are changed during optimization of the network dynamically.

* * * * *